United States Patent
Tatarinov et al.

(10) Patent No.: US 11,269,681 B2
(45) Date of Patent: Mar. 8, 2022

(54) SYSTEM AND METHOD FOR PERFORMING A TASK ON A COMPUTING DEVICE BASED ON ACCESS RIGHTS

(71) Applicant: AO Kaspersky Lab, Moscow (RU)

(72) Inventors: Ivan I. Tatarinov, Moscow (RU); Nikita A. Pavlov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 155 days.

(21) Appl. No.: 16/458,266

(22) Filed: Jul. 1, 2019

(65) Prior Publication Data
US 2020/0310868 A1    Oct. 1, 2020

(30) Foreign Application Priority Data

Mar. 29, 2019   (RU) .................................. 2019109166

(51) Int. Cl.
| | |
|---|---|
| *G06F 9/48* | (2006.01) |
| *G06F 9/445* | (2018.01) |
| *G06F 9/455* | (2018.01) |
| *G06F 9/46* | (2006.01) |
| *G06F 21/62* | (2013.01) |

(52) U.S. Cl.
CPC ........ *G06F 9/4881* (2013.01); *G06F 9/44505* (2013.01); *G06F 9/45558* (2013.01); *G06F 9/468* (2013.01); *G06F 21/6245* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 8,789,139 | B2* | 7/2014 | Picard .................... | H04L 63/08 |
| | | | | 726/2 |
| 9,147,069 | B2* | 9/2015 | Yablokov ................ | G06F 9/468 |
| 9,348,981 | B1 | 5/2016 | Hearn et al. | |
| 9,536,101 | B1* | 1/2017 | Demov ............... | H04L 63/0245 |
| 9,825,977 | B2* | 11/2017 | Demov .............. | H04L 63/0245 |
| 10,033,700 | B2* | 7/2018 | Ouye .................. | G06F 21/6209 |
| 10,230,729 | B2* | 3/2019 | Du ......................... | H04L 63/10 |
| 2002/0013909 | A1* | 1/2002 | Baumeister ............ | G06F 21/35 |
| | | | | 726/28 |

(Continued)

OTHER PUBLICATIONS

Longe et al. "Checking Internet Masquerading Using Multiple CAPTCHA Challenge-Response Systems", 2009 IEEE, pp. 244-249.*

*Primary Examiner* — Van H Nguyen
(74) *Attorney, Agent, or Firm* — Arent Fox LLP; Michael Fainberg

(57) ABSTRACT

A system and method for performing a task on a computing device based on access rights are described. In one aspect, an exemplary method comprises, gathering data characterizing a task by intercepting function calls used to perform the task, and sending a request to an operating system of the computing device to temporarily interrupt the called functions until access rights are determined, determining a threat level of the task based on the gathered data and task templates, generating a test based on the threat level and test generating rules and presenting the test to the user, analyzing results of the test and determining access rights of the task based on the results, and performing the task based on the access rights.

18 Claims, 6 Drawing Sheets

(56) References Cited

U.S. PATENT DOCUMENTS

| | | | |
|---|---|---|---|
| 2003/0120601 A1* | 6/2003 | Ouye | G06F 21/6227 705/51 |
| 2004/0064704 A1* | 4/2004 | Rahman | G06F 21/6218 713/182 |
| 2014/0181896 A1* | 6/2014 | Yablokov | G06F 21/53 726/1 |
| 2015/0039315 A1 | 2/2015 | Gross | |
| 2015/0339477 A1 | 11/2015 | Abrams | |
| 2017/0078319 A1 | 3/2017 | Thompson | |
| 2017/0161490 A1 | 6/2017 | Fedor | |
| 2018/0091513 A1* | 3/2018 | Du | H04L 51/04 |

* cited by examiner

SYSTEM AND METHOD FOR PERFORMING A TASK ON A COMPUTING DEVICE BASED ON ACCESS RIGHTS

CROSS REFERENCE TO RELATED APPLICATIONS

The present application claims priority to Russian Patent Application No. 2019109166, filed on Mar. 29, 2019, the entire content of which is incorporated herein by reference.

FIELD OF TECHNOLOGY

The present disclosure relates to the field of computer security, more specifically, to systems and methods for performing a task on a computing device based on access rights.

BACKGROUND

Virtual machines have become ubiquitous in todays networks. A virtual machine (VM) is a software environment which virtualizes a computing environment inside a physical machine (such as a computer or server). The physical machine is also known as the "host machine".

The rapid development of computer technologies in the last decade, and the widespread use of various computing devices (personal computers, notebooks, tablets, smartphones, and so on), has become a powerful stimulus to the use of those devices in diverse areas of activity and for a huge number of tasks (from Internet surfing to bank transfers and file transfers). As the number of computing devices and the volume of software running on these devices continues to grow, the number of methods of authorized access to the data being processed on these devices also continues to grow. In addition, the number of malicious programs and fraudulent methods of utilizing this data continues to grow at a rapid pace. Thus, issues of information security are becoming especially important.

At present, a large number of varieties of malicious programs exist. Some of the malicious programs steal personal and confidential data from the devices of users (such as logins and passwords, bank details, files). Other malicious programs form so-called botnets from the devices of users for attacks against other computers or computer networks, such as for a Distributed Denial of Service (DDoS) attack or for sorting through passwords, e.g., by brute force. Still other malicious programs are designed to propose paid content to users through intrusive advertising, paid subscriptions, sending of messages, e.g., via Short Message Services (SMSs) to toll numbers, and so forth.

One approach to mitigate the threats described above is to use antivirus programs. However, in practice, in certain situations, the antivirus programs are ineffective. For example, this approach is ineffective in the case of targeted cyber attacks on computer systems (such as advanced persistent threats (APTs)). In another example, the antivirus program may not be functioning on the computer system (e.g., uninstalled or disconnected) when the infection occurs. Thus, this approach may be useless for some scenarios.

For more reliable protection, along with the above-described approach, it is often necessary to utilize the expertise of the user, which involves correcting or supplementing the work of the antivirus program. For example, the user may select a way of solving a problem from among multiple ways, or the user may enter data into the system so that the system may continue to operate. For instance, the user may enter data to enable the system to detect one or more of: unauthorized access, directed cyberattacks, and execution of unknown programs. For this purpose, tools for authorization (logins and passwords), determination of user actions, and administration of automated public Turing tests are used. These tools enable the user to interact with elements of the security system of the computing device.

However, even when the expertise of the user are utilized, there are shortcomings. For example, the automated public Turing tests that are designed to determine the presence of a human in systems and to block critically important tasks from being performed in an automated manner. However, they may not be resistant to directed cyber attacks or to having the tests passed by a machine. For example, narrowly specialized automation algorithms may be created to pass predetermined and well known tests (e.g., tests based on text recognition). The static nature of the tests enables criminals to have time to study the tests thoroughly and develop algorithms for passing them. Thus, the known technologies for data security are vulnerable to attacks by malicious programs that bypass requests to perform tasks, e.g., tasks associated with automatic public Turing tests.

Thus, there is a need for a more optimal solution for providing authorized access to computer resources and performing actions that are critical to information security on computing devices based on access rights.

SUMMARY

Aspects of the disclosure relate to the field of computer security, more specifically to systems and methods for performing a task on a computing device based on access rights.

In one exemplary aspect, a method for performing a task on a computing device based on access rights is implemented in a computer comprising a hardware processor, the method comprising: gathering data characterizing a task by intercepting function calls used to perform the task, and sending a request to an operating system of the computing device to temporarily interrupt the called functions until access rights are determined, determining a threat level of the task based on the gathered data and task templates, generating a test based on the threat level and test generating rules and presenting the test to the user, analyzing results of the test and determining access rights of the task based on the results, and performing the task based on the access rights.

According to one aspect of the disclosure, a system is provided for performing a task on a computing device based on access rights, the system comprising a hardware processor configured to: gather data characterizing a task by intercepting function calls used to perform the task, and send a request to an operating system of the computing device to temporarily interrupt the called functions until access rights are determined, determine a threat level of the task based on the gathered data and task templates, generate a test based on the threat level and test generating rules and present the test to the user, analyze results of the test and determine access rights of the task based on the results, and perform the task based on the access rights.

In one exemplary aspect, a non-transitory computer-readable medium is provided storing a set of instructions thereon for performing a task on a computing device based on access rights, wherein the set of instructions comprises instructions for: gathering data characterizing a task by intercepting function calls used to perform the task, and sending a request to an operating system of the computing device to temporarily interrupt the called functions until access rights are determined, determining a threat level of the task based on the gathered data and task templates, generating a test based on the threat level and test generating rules and presenting the test to the user, analyzing results of the test and determining access rights of the task based on the results, and performing the task based on the access rights.

In one aspect, the task is for at least one of: control of a process for processing data including personal or confidential data of the user, control of a process being performed either on the computing device or on another computing device communicatively coupled to the computing device, control of an application, and changing or configuring working parameters of an operating system of the computing device.

In one aspect, the task is at least one of a task involving: a creation, a modification, or a deletion of personal or confidential data of the user on the computing device, a sending of data through a computer network, a creation or modification of files, a control of the computing device, and a control of software running on the computing device.

In one aspect, the task for the control of the computing device includes at least a task for: working with objects of a file system of the computing device, working with rights of objects of an operating system of the computing device, working with graphic interface elements of an application on the computing device, and controlling an operating mode of equipment of the computing device.

In one aspect, the data characterizing the task includes at least: parameters and attributes uniquely identifying the task from among a plurality of tasks, and parameters and attributes of the computing device that are necessary for performing the task.

In one aspect, the threat level is provided as a numerical value characterizing a probability of performing the task causing harm to information security of the computing device, the probability being based on the gathered data and a similarity of the task to another task for which a threat level has been previously determined.

In one aspect, the performing of the task comprises includes: performing the task on a virtual machine, determining whether the user successfully passes the test, and adopting changes made on the virtual machine to the computing device when the user successfully passes the test.

In one aspect, the threat level of a current task is determined as a function of threat levels of one or more previous tasks.

In one aspect, the method of the present disclosure performs a task on a computing device based on access rights. The method is designed to authorize a user depending on actions performed by that user on the computing device. The method of the present disclosure advantageously enables information security of the data.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
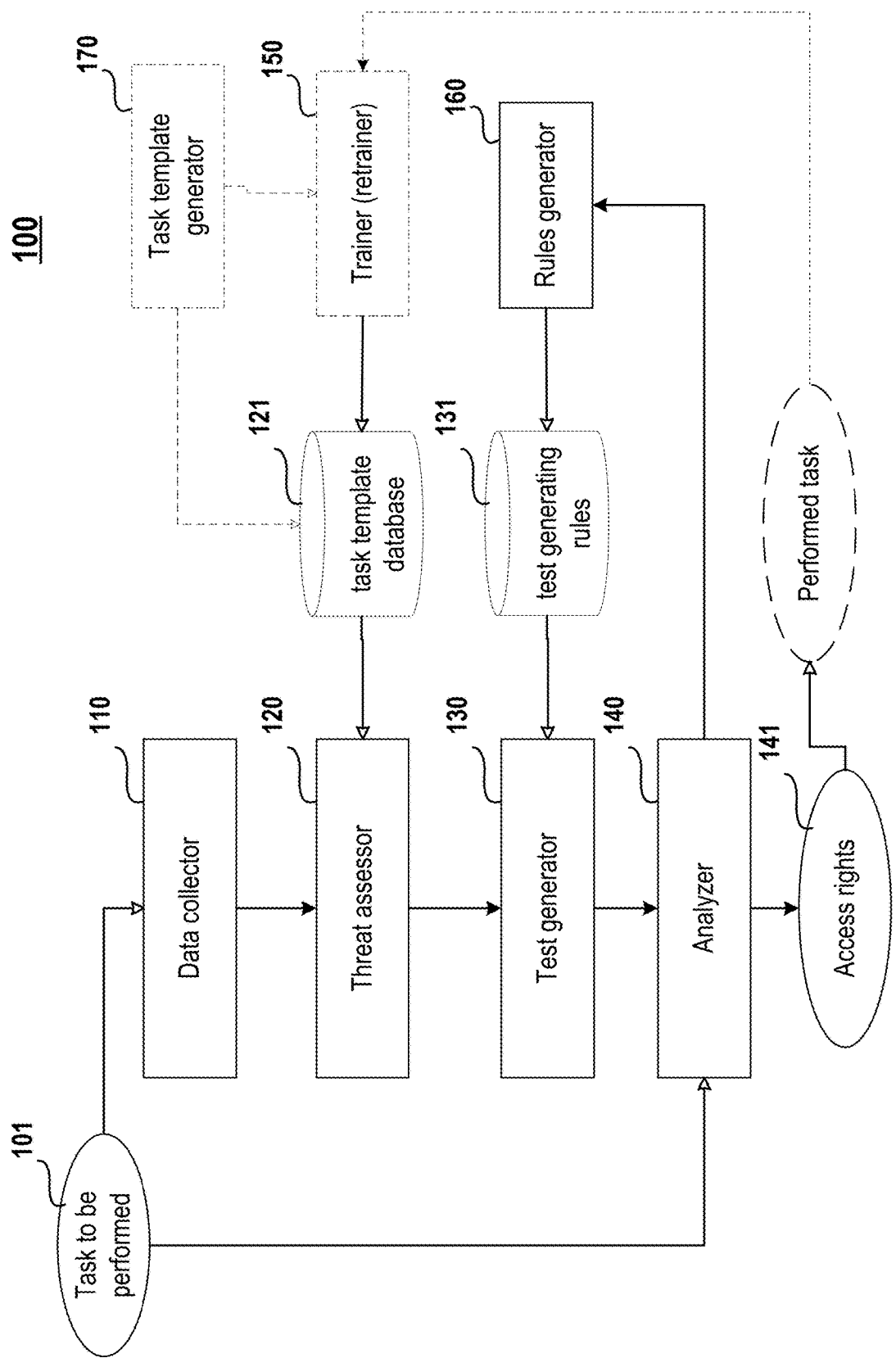
FIG. 1 illustrates an example structural diagram of a system for performing tasks on a computing device based on access rights in accordance with aspect of the present disclosure.

Exemplary aspects are described herein in the context of a system, method, and a computer program for performing a task on a computing device based on access rights. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

An automated public Turing test (e.g., CAPTCHA— Completely Automated Public Turing test to tell Computers and Humans Apart) is a computer test used to determine whether the user of a system is a human or a machine (e.g., a computer).

Protected information refers to information which is proprietary and which is subject to protection in accordance with the requirements of legal documents or the requirements established by the owner of the information.

Critical user data refers to data which can be used (e.g., modified, deleted, copied) to inflict significant harm on an individual (the subject of the critical data) or the system (e.g., a computing device) on which the individual is working.

Personal data refers to any information pertaining to an individual (i.e., the subject of the personal data) who is identified or identifiable on the basis of such information, including the individual's last name, first name, middle name, year, month, date and place of birth, address, family, social, and financial status, education, profession, income, or other information.

Access rule refers to a set of rules establishing an order and one or more conditions for access by a subject (user) to protected information (e.g. the personal data) and its carriers.

Access right refers to a set of rules used for accessing protected information. The access rights are established by legal documents or by the owner of the information.

Targeted cyberattack (APT—Advanced Persistent Threat) refers to a type of cyberattack which is controlled manually, in real time, by a person who is the center of the attack. The goal of the attack is to steal protected information from the information system of a particular company, organization, or governmental service. Important distinguishing features of targeted attacks include: their duration, a lengthy and resource-hungry period of preparation, and a use of technology and/or computer systems to carry out the targeted attacks. The comprehensive approach to the design of the targeted attack may include: actively influencing people with the aid of psychology, methods of social engineering, and zero-day exploits against equipment.

Automated public Turing tests are based on a purely human way of solving abstract problems, wherein each user solving these Turing tests will solve them individually, by methods unique only to that user. The uniqueness to the user may include features such as the speed of passing the test, the actions performed by the user in passing the test, and the possibility of learning from one's experience and correcting methods used to pass the test. For example, the most simple instances of such an individual way of passing a test include shifting an object on a desk from one place to another, or making a selection among many elements arranged from left to right, and so forth. Thus, such a Turing test enables, not only the ability to determine whether a person or a machine is taking the test, but also exactly which individual person that has previously taken the given test is taking the test at the present time. These principles of the Turing test form the basis for enhancing the information security of computing devices by having a person confirm the critically important tasks being performed on the computing devices.

FIG. 1 illustrates an example structural diagram 100 of a system for performing tasks on a computing device based on access rights in accordance with aspect of the present disclosure.

The structural diagram of the system for performing a task on a computing device contains a data collector 110, a threat assessor 120, a test generator 130, an analyzer 140, a trainer 150, a rules generator 160, and a task template generator 170.

The data collector 110 is designed to: gather data characterizing a control task of the computing device (hereinafter, the task 101); and send the gathered data to the threat assessor 120.

In one aspect, the task of the computing device 101 may include tasks for: creating, modifying, deleting or sending data through a computer network (such as files).

In one aspect, a task 101, when recognized as being critical to a security of the computing device, is blocked from being performed on the computing device until an access right of the control task 101 is determined by the analyzer 140, as described below.

For example, tasks 101 such as the deletion of a file, writing to hard disk or sending data through a computer network, if recognized as being critical to the security of the computing device (for example, on the basis of statistics on cyberattacks on different computing devices previously gathered and analyzed), are temporarily blocked from being performed on the computing device (until a decision is made by the analyzer 140). For these tasks 101, data is gathered which characterizes these tasks 101, and after the user of the computing device successfully passes the automated public Turing test generated by the test generator 130, permission is granted to perform the aforementioned tasks 101 (deletion of a file, writing to hard disk or sending data through a computer network) on the computing device in accordance with corresponding access rights 141 (for example, corresponding commands are issued to the operating system, APIs are used to block and unblock the processes carrying out these tasks 101, and so forth).

In yet another aspect, the gathering of the data characterizing the task 101 is done by intercepting function calls used to perform the respective task 101. The interception of the function calls may be done with the aid of a specialized driver.

For example, with the aid of the specialized driver, the API function calls used to perform the given task 101 are intercepted. For example, the task 101 for sending data to a computer network, as performed in the Windows operating system, uses the functions socket, recv, send and so forth, which may be intercepted by the network driver.

In yet another example, if the task 101 being performed consists of several partial tasks, different data gathering methods may be used jointly. For example, the task of installing software consists of partial tasks such as: working with the file system for writing of the files being installed to disk, working with memory to allocate large data volumes for performing the operations of unzipping of the files being installed, working with the register to enter the parameters of the software being installed, and so forth. In this case, the file system driver is used to track the functions performed by CreateFile, ReadFile, WriteFile, etc., hooks are installed and used to track the functions being performed by HeapAlloc, VirtualAlloc, CreateFileMapping, etc., and software setting files, software installation logs, etc., are monitored and analyzed to determine the parameters that influence the work of the software.

In yet another example, after the function calls have been intercepted, a request is sent to the operating system to temporarily interrupt the called functions—thereby preventing the called functions from being performed. For example, with the use of splicing technology, a monitored application, upon calling a WinAPI function (such as CreateFile), first refers to the monitoring application (such as a driver) and only then does the driver redirect the call of the intercepted function to the operating system to be performed. If the logic of the driver requires otherwise, then the intercepted function will not be sent to the operating system; and in this case, the monitored application, having called the intercepted function, will be sent the necessary data so that the application "considers" the called function as being correctly performed.

In yet another aspect, the task 101 represents at least a task for:

control of a process being performed by the operating system on the computing device that is responsible for the processing of data critical to information security, including personal or confidential data of a user or a corporation with which the user is working directly (for example, Microsoft Office files. The process being performed may be for creating, modifying or deleting of files, installing of software on the computing device, data archiving, and so forth;

control of a process being performed by the operating system either on the given computing device or on other computing devices connected to the given device in a computer network, such as in a client-server architecture. The interaction between the given computing device and other computing devices may, in one example, be an interaction with sites using a web browser. In this case, the data collector 110 and the analyzer 140 may operate on different clients and/or servers;

control of an application using a graphic interface of the application, including the entering of data by the user or control of the analysis of that data. For example, the task 101 may involve entering confidential user data such as logins and passwords with the aid of administrative tools, where it is important not only which type of confidential data is being entered, but also the manner and interface used for entering the data, i.e., the means used to enter the data. In another example, information is gathered on: a list of actions in the system that were performed by the user, a list of elements of the graphical interface of the application that were used, information related to how a mouse is moved to enter data, information related to buttons pressed to enter data, and so forth; and changing or configuring the working parameters of the operating system, including changing the operating system mode (i.e., how the operating system responds to actions being performed by the users and the applications working in the operating system, such as to control access rights 141). For example, the changes or configurations may be to control administrative rights and access rights by applications and/or users, etc.

In a first example, when using a client-server architecture, data is stored in the cloud (on one remote resource), processed on a server (on another remote resource), and sent to the client by the server (a local resource) on demand from that client. In this case, the tasks 101 are performed on the server, but in order to allow the tasks to be performed, data is requested from the client, so that the data collector 110, the threat assessor 120, and the test generator 130 run on the server, while the analyzer 140 runs on the client. In a second example, the reverse situation is possible, where the data collector 110, the threat assessor 120, and the test generator 130 run on the client, while the analyzer 140 runs on the server. Depending on which operating scheme is chosen in the client-server architecture, information security is provided for the client (first example) or the server (second example).

In one aspect, the task 101 may represent a collection of several tasks 101. For example, the task for a modification of an Adobe PDF file may involve several other tasks, e.g., tasks for: obtaining of the file from a site, unzipping of the required document, and subsequent modification of the unzipped document.

For example, upon intercepting the data, the task 101 is postponed and not performed (e.g., the operating system is given commands to refuse the performance of the task), and is resumed only after the user of the computing device successfully passes the automated public Turing test generated by the test generator 130. The task 101 is performed based on the access rights 141 determined by the analyzer 140, which are, in turn, determined on the basis of the data gathered by the data collector 110.

In one aspect, all the tasks 101 on the computing device are virtualized (i.e., they are performed in a virtual machine) and only after the user successfully passes the test are those tasks 101 performed, and the changes made by the tasks adopted on the physical device. In certain cases, not all the tasks 101 may be virtualized, but only those with task threat levels, as determined by the threat assessor 120, as being at a threat level higher than a given threshold value.

In one aspect, the analyzer 140 is a component of a hypervisor; all the tasks 101 are performed on the virtual machine under control of this hypervisor, and in the event that the user does not pass the Turing test generated by the test generator 130, the tasks 101 are blocked from being performed, and the virtual machine returns to a state prior to the launching of those tasks 101.

In yet another aspect, the analyzer 140 performs the task 101 by:

interacting with the operating system (for example, through an API provided by the system); and interacting with processes of the applications processing the tasks 101 (for example, by halting or starting those processes, intruding in the processes, and so forth).

In yet another aspect, the tasks 101 are at least:

tasks involving a creation, modification, or deletion of personal or confidential data of the user on the computing device;

tasks involving a sending of data through a computer network;

tasks involving a creation and modification of files;

tasks involving a control of the computing device, wherein the tasks for the control of the computing device involve at least:
  a) working with objects of the file system (creation, deletion, modification of files and their attributes),
  b) working with rights of objects of the operating system (modification of the access rights of objects of the file system and memory system, including executable processes);
  c) working with graphic interface elements of an application; and
  d) control of operating modes of equipment of the computing device (for example, working with network equipment, a video system, an audio system, and so forth); and tasks involving a control of software running on the computing device.

For example, the aforementioned tasks 101 may include: the creation, modification, or deletion of files, the sending of data through a computer network, the changing of the rights to work with objects of the computing device (for example, with files), the changing of the state of the computing device, the changing of the privileges for working on the computing device, the control of applications with the aid of the graphical interfaces provided by applications running on the computing device, and so forth.

In yet another aspect, the data characterizing the task 101 includes at least:

parameters and attributes uniquely identifying the given task 101 among other tasks; and parameters and attributes of the computing device necessary to perform the given task 101, e.g., attributes and parameters of computing resources.

For example, for the task 101 "file deletion" the parameters will be the name of the file destined for deletion, the identifier of the process or the user who initiated that task 101, and so forth.

In yet another example, for the task 101 "sending data through a computer network" the parameters may include: a pointer to the data being sent, an identifier of the process sending that data, and an address of the recipient of the data being sent, a checksum of the data being sent, etc. The attributes may include: the type of data (for example, text, pictures, media data, executable applications, databases, files, and so forth), the rights for working with the data being sent, and so forth.

The threat assessor 120 is designed to:

determine the threat level of the task 101 on the basis of the data received about the task 101, the threat level of a task characterizing the level of threat to the information security of the computing device in event that the task is performed; and send the threat level of the task 101 to the test generator 130.

In one aspect, the threat level of the task to the computing device is provided as a numerical value, characterizing the probability that performing the task will cause harm to the information security of the computing device; the probability is calculated on the basis of the gathered data characterizing the task, and further based on a similarity of the task to at least one previously specified task for which a threat level to the computing device has been previously determined.

The threat level of the device may be calculated by any ordinarily known by those skilled in the art of data security, including a Common Vulnerabilities and Exposures (CVE)) method of assessing a degree of vulnerability of applications (https://www.cvedetails.com). When using CVE, the assessment of the degree of vulnerability is provided as a numerical value ranging from 0 (to indicate no vulnerability) to 10 (to indicate a dangerous level of vulnerability, i.e., a real danger to information security exists), where in certain information security control systems the use of applications is not recommended for a value greater than or equal to 4, and it is forbidden for a value greater than 8.

In yet another aspect, the threat level of a current task 101 is determined as a function of a threat level of a previous task 101.

For example, in a task of installing an application and setting up the operations of the application in the operating system, several independent tasks may be involved, each of which has its own threat level, and each successive task, given the preceding task was performed, may be assigned a higher threat level when compared to the scenario in which the preceding task was not performed. For example, the task of installing a user data backup service may involve the following sub-tasks: 1) unzipping the installation package, 2) running the installation package, 3) writing the files of the service being installed to a system folder of the operating system, 4) modifying the registry keys of the operating system (including replacing the old values of the keys with new ones, for example, the path to the files of the service being installed), 5) launching the service (loading the service file into memory, transfer of control to the service loaded, and so forth), 6) connecting to an external address in the computer network, 7) receiving tasks in the computer network (for example, updating). Each of the described steps may have a low threat level, since it does not present a threat to the information security of the computing device (for example, step 1) or step 7) in themselves have no influence at all on information security), but if certain steps are performed one after the other and utilize the results obtained in previous steps, they may carry a threat to the information security of the computing device (for example, steps 6), 7) and 5) allow the execution of malicious code obtained in a computer network, or the sending of personal or confidential user data to hackers, and consequently the threat level of such a combination of steps will be substantially higher than the threat level of each individual step). Furthermore, the threat level of each step may be influenced not only by the threat level of a previous step, but also by the data which was received in the previous step.

In yet another aspect, the threat level to the computing device is greater as the probability is higher. For example, the task being analyzed may prove to be an element of a targeted cyberattack. The threat level is determined by the threat assessor 120 on the basis of a task template database 121, which is generated by the trainer 150, including with the use of methods of machine learning. The parameters of the task 101 are compared to the indicated templates from the task template database 121 with the help of a previously trained model, generated and updated by the trainer 150. As a result, the similarity of the aforementioned task 101 with at least one of the task templates is determined, and the threat level of the task is determined from the degree of similarity to said templates and the threat levels of said templates.

For example, in the above-described instance, the threat level of the task 101 may be determined by the formula:

$$w_j = \sum_{i=1}^{N} s_{ij} w_i \times [m_i(s_{ij})]$$

where
$w_j$—is the threat level of the j-th task 101,
N—is the number of templates found with the aid of the trained model,
$s_{ij}$—is the degree of similarity between the j-th task 101 and the i-th task template,
$w_i$—is the threat level of the i-th task template,
$m_i(s_{ij})$—is a correction term (coefficient), taking into account how much the aforementioned model has been trained for working with the specified j-th task 101.

In a first example, a downloading of a file from a computer network at an address not yet ever accessed from the given computing device, extracting from the downloaded file of an installation package with a name having a high entropy of characters (i.e., with a high probability of being randomly generated), and then running of that file may be considered together to be a task, e.g., a task No. 1 101, for introducing a malicious software in the computing device, e.g., as performed by methods having characteristics of a targeted cyberattack. In a second example, downloading from the computer network at an address previously accessed from the given computing device of an executable application having a name from a list of approved names, and then executing that application, may be considered to be a task, e.g., task No. 2 101, for installing of a safe (albeit unverified) software on the computing device. In the first example, task No. 1 101, constituting a greater threat to the security of the computing device, will have a higher threat level (for example, 0.80) than task No. 2 101 of the second example (for example, 0.30).

In yet another example, the threat level may depend on the time of performance of the task 101 or the duration of the task 101 being performed.

In yet another aspect, the threat level of the a task 101 is provided as a numerical value, characterizing the probability that said task 101 may be a threat to the information security of the computing device, and level of that threat.

For example, the threat level of a task 101 may lie in the range from 0.0 (performance of the task 101 is guaranteed not to constitute a threat to the information security of the computing device) to 1.0 (performance of the task 101 is guaranteed to constitute a threat to the information security of the computing device, for example, the sending of confidential user data through the computer network).

In yet another aspect, the determination of the threat level of the task is based on previously determined task templates from the task template database 121, where a task template constitutes one or more tasks characterized by parameters and attributes in specified ranges, where the task parameters and attributes constitute characteristics which can be used to compare tasks with one another and determine a degree of similarity of a given task to tasks from the template database 121, wherein each task template from the task template database 121 is matched up with a threat level.

In one aspect, the task template database 121 is generated in advance on the basis of accumulated statistics on the tasks 101 performed on various computing devices, and the task templates themselves are created so as to properly determine the threat levels for all said tasks 101 on the basis of said templates.

For example, knowing how the Microsoft Office applications work, it is possible to identify all tasks 101 performed by those applications, and, knowing the results of the working of those applications, it is possible to calculate the threat levels for each task 101 and generate corresponding task templates, which will afterwards be used in operations of the system of the present disclosure.

In yet another example, knowing how a computing device is constructed, which tasks it performs, and work with which data is critical to the information security of the computing device, it is possible to generate task template database 121 in advance, where each action is assigned its own threat level based on the possibility of causing harm to the computing device or to the data on the computing device.

For example, the working cycle for working on files is known from statistics gathered from a large sample of users. The working cycle with such files can be represented by the template [create]→ [modify]→ . . . → [modify]→ [save/archive]→ [send by email]. On the basis of other statistics gathered from a large sample of malicious programs, how malicious programs work with files is also known. An analysis of the user statistics is then performed to assess the extent to which a given work/operation deviates from standard work. Depending on the extent to which the given work deviates from the standard work, a threat level may then be assigned to certain actions taken while working with documents. Such deviations from standard work might involve:

creating a file with a name having a high entropy of the characters used in the name, which might indicate that a file is being generated automatically (including by a malicious program);
renaming a file with name attributes as described above;
sending a file not by email, but by other methods (for example, through P2P networks);
archiving of a file in different archives; and
archiving of a file in which no modifications have been made.

In yet another example, on the basis of previously gathered statistics from various computing devices, including the one being described, as to the working of the users on those computing devices and as to the working of automation is determined by any method ordinarily known in the art. For example, automation techniques may be used for solving completely automated public Turing tests, the sequence of tasks leading to an identical result, yet using different means (by a human and by a machine is determined by any method ordinarily known in the art. For example, sending data in a computer network by a human differs from sending data by a machine in a: response time to the establishing of the connection, choice of a method of data transfer, possibility of data encryption, and so forth. Differences in the sequences are utilized to calculate the threat level of the task by using any known techniques to determine similarities. Thus, even if the test happens to be solved successfully, yet it is found that the method of solving it is more typical of a machine, the test will be deemed to have been failed (for certain tasks critically important to information security), and as a result the task 101, for which the test was generated to confirm, will not be performed.

For example, with the aid of an analysis of the movement of a mouse cursor (deviation from rectilinear, uniform movements, determination of harmonics, etc.), it is possible to determine that the cursor is being moved by a person, and not by a machine.

In yet another aspect, the threat level is determined by a degree of similarity of the given task to at least one task template from the task template database 121 in consideration of the threat level indicated by that template.

For example, the task template describes the writing of data to a Microsoft Word file, while on the computing device data is being written to a Microsoft Excel file. Based on the fact that the data being written is represented in the same XML form, the writing is being done to files of the same software product Microsoft Office, and so forth, the threat assessor 120 makes a decision that this task is similar and the task of writing to a Microsoft Excel file receives the same threat level as assigned to the writing to a Microsoft Word file. Furthermore, any method known in the art may be used for comparing the tasks 101.

For example, the following comparison algorithm may be used for comparing the tasks 101:

1) each task is broken down into elementary actions characterized by a minimal number of parameters;
2) each action is matched up with its own unique hash (in the most simple case, a unique numerical identifier), which together with the above-mentioned parameters forms a bytecode (an intermediate code);
3) for all of the bytecodes generated, the degree of similarity is computed for each of them with the aid of algorithms for computing an edit distance, such as the Levenshtein distance; and
4) if the computed distance does not exceed a given threshold value, the compared tasks 101 are considered to be similar.

In yet another aspect, the task threat level has a similar nature (similar technologies and methods of determination and interpretation are used) to the degree of harmfulness of the objects of the computing device determined during the performance of an antivirus scan by any known method, including methods used to identify targeted cyberattacks.

For example, when performing an antivirus scan, the antivirus determines the degree of harmfulness of the analyzed objects—the probability that the analyzed object might prove to be harmful (this is especially indicative for heuristic analysis or proactive protection)—and, depending on how high the determined degree of harmfulness is, the antivirus gives a verdict as to whether the analyzed object is safe, suspicious, or malicious. Depending on how many of the analyzed objects on the computing device are respectively safe, suspicious, or malicious (or what value is obtained for the sum total degree of harmfulness of all the analyzed objects), the antivirus makes a decision as to the degree of harmfulness of the computing device as a whole.

In yet another example, the degree of harmfulness of a system may be influenced by the state of the above-described antivirus—the state of the antivirus databases (volume, last update), the antivirus modules connected (for example, a module for heuristic analysis or proactive protection, a rootkit search module, and so on), the presence of files in quarantine, and so forth. Depending on all these factors, the system may have a greater or lesser degree of harmfulness.

In yet another example, it is possible to use methods employed in signature and heuristic analysis of files when scanning them for harmfulness on the basis of a database of antivirus records.

In yet another aspect, the threat level of the task is determined with the aid of a trained model, generated by the trainer 150 on the basis of previously performed tasks 101.

For example, the use of a trained model for determining the threat level of a task 101 makes it possible for the task template database 121 to contain, not the actual templates of actions, but instead models trained on these templates, which in turn increases the speed and accuracy of determining the threat level of tasks and lowers the demands on the computing resources of the computing device. In certain cases, the use of task templates 121 is less effective when compared with the use of models trained on these templates, especially when it is necessary to use a large number of task templates 121 for the determination of the threat level of a task 101. In this case, it is expedient to employ trained models.

In yet another example, trained models may be used to determine the threat level of a task 101 in the case when the task contains a large number of smaller (and simple) tasks, which in turn also contain other smaller tasks. In this case, a large number of task templates 121 may be used to determine the threat level of the task 101 (and all its sub-tasks), which adversely affects the utilization of computing resources of the computing device and the time to calculate the threat level of the task 101, and it is therefore more expedient to make use of a model trained on the basis of said task templates 121.

The test generator 130 is designed to:
  generate an automated public Turing test (hereinafter, the test) in dependence on the obtained threat level of the task based on specified test generating rules 131; and
  send the generated test to the analyzer 140.

In one aspect, the test is generated such that, for tasks with a higher threat level, the probability of a test collision is lower, where the test collision is at least:
  a successful passing of the test by a person who is not an authorized user of the computing device; and
  a successful passing of the test with the aid of a machine, e.g., a computing device.

For example, the test for confirming a task 101 with a low threat level (for example, the sending of data in a computer network) might constitute a problem of recognizing a text 312 created with slight distortions relative to a standard text 311, while the test for confirming a task 101 with a high threat level (for example, formatting a hard disk) might constitute a problem of recognizing a text 314 created with significant distortions relative to a standard text 311.

In yet another example, the test for confirming a task 101 with a low threat level might constitute a more simple type of problem (recognition of text 310), while the test for confirming a task 101 with a high threat level might constitute a more complicated type of problem (classification of objects 320).

In yet another aspect, if the probability of conducting a targeted cyberattack is above a given threshold value, the test is generated so as to rule out a passing of that test by machines being used in the targeted cyberattack, where the probability of conducting a targeted cyberattack constitutes a numerical characteristic expressing the probability that the tasks 101 being performed on the computing device are being performed not by an authorized user of the computing device, but by a hacker or by machine (computing device) belonging to a hacker, and the actual method for calculating this probability is performed by any method known in the art (for example, by methods used to perform proactive antivirus scans).

For example, a machine can solve text recognition problems 310 (such as recognizing a distorted text or "challenge-response test" 311-314) with a high probability, and classification problems 320 (such as determining the varieties of bullfinches 321-324) with low or medium probability, but are virtually unable to solve problems requiring associative thinking and working with fuzzy rules, as in graphic puzzles 330 (for example, determining films from thematic images 331-334).

In yet another aspect, the test is generated on the basis of data regarding at least:
  the actions of the user on the computing device, including the classification of user information on the computing device, the applications being launched, and so forth; and
  information being requested by the user on the computing device, including data obtained from the user query history log in the browser, data obtained from the user profile in social networks, and so forth.

For example, if the user of the computing device quickly and correctly passes all the image recognition tests 312, the following image recognition tests might become more complicated (by introducing greater distortions in the text image)—313. If the time for successful passing of the test begins to exceed a given duration, further complication of the test ceases 314.

In yet another example, in order to get around automatic classification, it is possible to select images such that they can be assigned to several classes. For example, 321 shows two bullfinches of the same kind, while 322 shows one bullfinch of a different kind, so that the classification can be done either by the number of birds or by their belonging to different kinds.

In yet another aspect, the generated test may constitute at least:
  a problem of recognition of pictures, including at least:
    1) a problem of text recognition 310,
    2) a problem of classification of images 320, and
    3) a problem of semantic puzzles 330;
  a problem of recognizing audio fragments; and
  a problem of recognizing media data.

In yet another aspect, specified test generating rules 131 are established by the authorized user of the computing device (including depending on the habits, knowledge, or preferences of that user).

In yet another example, the user on the basis of his or her knowledge and habits may establish the appearance and the content of the test, so that he or she will perform better on such tests than other users and machines. For example, if the user of the computing device is an ornithologist, he or she may select a problem of classification of kinds of birds 320 as the test, and the complexity of the test will involve increasing the number of classes of images or increasing the similarity of the images to each other.

In yet another aspect, the complexity of the test changes, depending on the threat level of the task.

Figure 3:
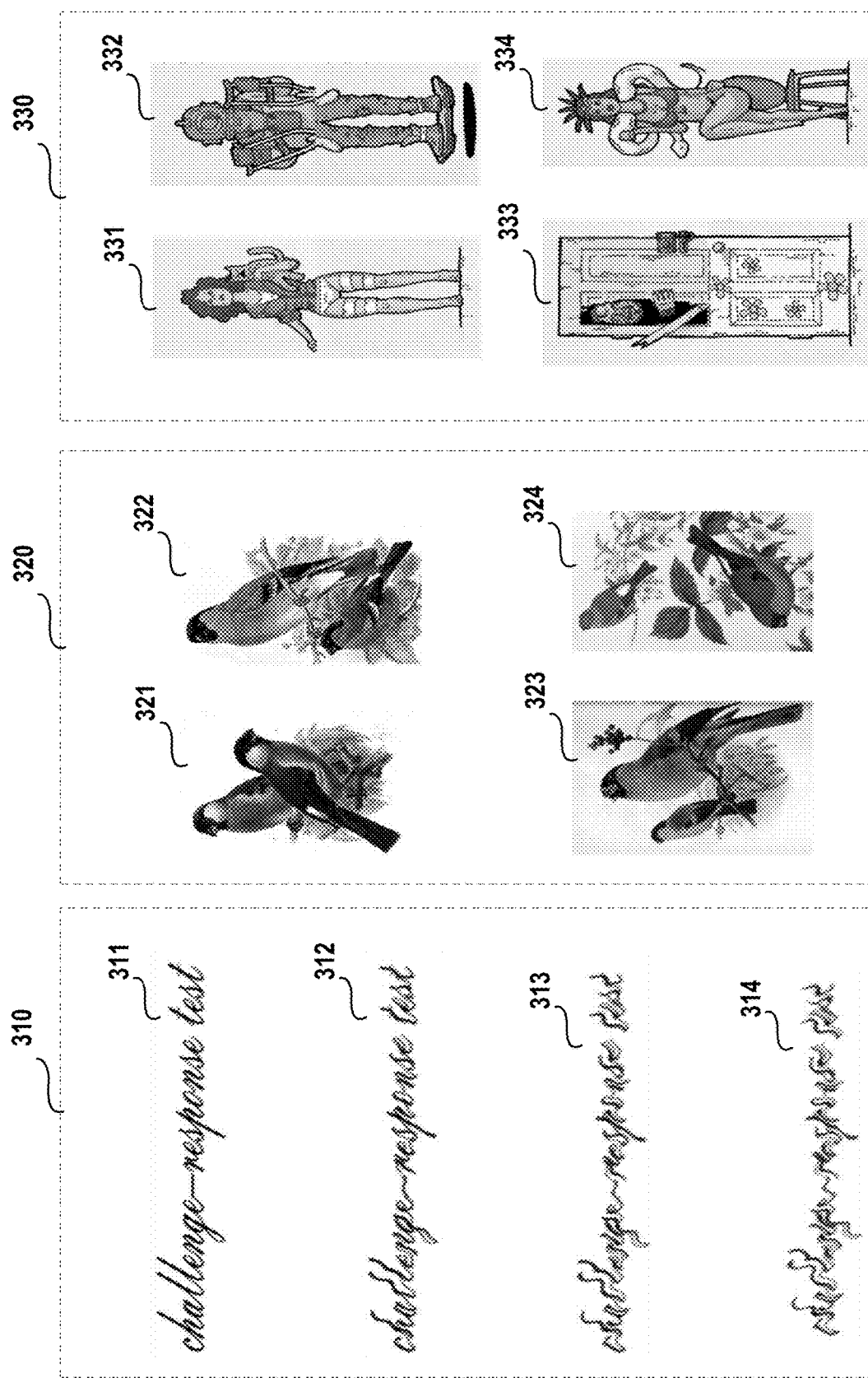
FIG. 3 illustrates an exemplary correctible automated public Turing test.

FIG. 3 illustrates an exemplary correctible automated public Turing test. For example, the complexity of the test changes, at least:
  in the event of using test recognition problems the degree of distortion of the test increases with an increasing task danger level (FIG. 3: 311-314);
  in the event of using image classification problems, the number of possible classes increases (FIG. 3: 321-324); and
  additional semantic elements are added to the problem generated with increasing danger level (for example, mathematical tests to solve examples, replacing number problems with text problems, and so forth).

In yet another aspect, the test generating rules 131 may be at least:
- ready-made tests, not depending on external parameters;
- test templates, containing information about the test, on the basis of which the test is generated directly as a function of external parameters; and
- logical, lexical or semantic rules of generating tests or the test templates.

For example, for classification problems 320 a collection of pictures may be specified in advance, from which a picture is selected for the test in random order.

In yet another example, problems with semantic puzzles may be generated on the basis of a previously specified collection of images, but with changing associative rules. For example, 330 depicts 8 pictures for a film determination problem, which are combined with each other such that each combined picture contains elements from two different films and, not knowing which element is the key, it is impossible to correctly solve the problem.

In yet another aspect, after generating a test with the aid of the test generator 130:
- the test is presented to the user for solving;
- data is obtained from the user as to the passing of the test (the solving of the problem presented in the test);
- parameters are determined describing the passing of the test by the user; and
- the obtained results on the passing of the test and the parameters determined are sent to the analyzer 140.

For example, when the test is passed, data is gathered, e.g., as to the time elapsed for passing the test, the actions of the user (are helper applications running, which test elements are used first, if such an option exists, and so forth), etc. This data may be used afterwards for correcting the test generating rules and for evaluating success in performing the test.

In yet another aspect, the user himself or herself sets up the test generator 130 in advance, i.e., he or she specifies the rules which will afterwards be used for generating tests, including:
- adding images, text, audio fragments, etc., by templates;
- specifying the complexity of the test; and
- selecting ways of distorting the test depending on the specified complexity.

The test is then serialized and saved (including with the use of encryption) as one of the test generating rules 131.

When generating the test, at first a determination is made as to the user for whom the test needs to be generated (for example, depending on the user's account) and the test is generated by those rules which the particular user has indicated "for themselves". The analyzer 140 is designed to:
- determine the access right 141 for the task 101 depending on the result of performance on the generated test by the user of the computing device; and
- perform said task 101 with the determined access rights 141.

In one aspect, during the analysis of the success of performance of the test by the user of the computing device, the degree of similarity of that result to a standard result as determined by the test generator 130 (in the test generating step) is determined.

For example, in a test where it is necessary to select several images, a determination is made as to how many images match up with the images from a standard result, and the accuracy of solving the test is determined as the ratio of the number of incorrectly chosen images to the number of correctly chosen images.

In yet another aspect, test passing parameters obtained by the test generator 130 are used in the analysis of the success of performance of the obtained test by the user of the computing device.

For example, if the user has correctly passed the test, yet spent considerable time on it (more than a specified value), the test is considered not to have been passed.

In yet another aspect, the success of performance of the test by the user of the computing device is evaluated by calculating the degree of success in performance of the test, which is a numerical value where the minimum corresponds to the test being definitely failed, and the maximum to the test being definitely passed successfully.

For example, instead of a binary evaluation of the success of performance of a test ("pass" or "fail"), the degree of success in passing the test is evaluated (by any method known in the prior art, including methods making an evaluation, in problems containing multiple choice answers, of the ratio of incorrect to correct answers) from 0.0 (test definitely failed) to 1.0 (test definitely passed), and if the degree of success in passing the test is higher than a specified value (for example, 0.75) the test is considered to have been passed. It is also possible to use a low evaluation of the degree of success in passing the test (for example, 0.25) in the same way, such that, if the calculated degree of success in passing the test is lower than the specified value, then the test is considered to have been failed, but if the calculated degree of success in passing the test is above the lower specified value (0.25), but below the upper specified value (0.75), the success in passing the test is considered to be undetermined and a following test is generated for the user; it is also possible to establish even more rigorous lower and upper limits (for example, 0.10 and 0.90 respectively).

In yet another aspect, the access rights to perform the task 101 are determined as a function of the value for the degree of success in passing the test.

For example, if the task is one of gaining access to a file, then upon successfully passing the test with a degree of success above a specified value (for example, 0.95) the user of the computing device is granted full rights to work with the file; if it is above another specified value (for example, 0.75), then only rights to reading of data are granted; otherwise, no access at all to the file will be granted.

In yet another aspect, the access rights 141 to perform the task 101 will be right #1, to forbid performance of the task 101, and right #2, to allow performance of the task 101.

For example, when deleting a file, this operation may only be either forbidden to be performed or allowed to be performed for a given user. On the other hand, the operation of opening a file may have several access rights 141—a read right, a write right (including a delete right), and an execute right.

The trainer 150 is designed to retrain the model used for determining the threat level as a function of which task 101 was allowed to be performed (after the user has passed the test), with which rights that task 101 was performed, and which consequences to the security of the computing device were produced by the performance of the task.

In yet another aspect, the training/retraining of the model and the generating of the task template database 121 is done on the basis of an analysis of the state of the computing device and its degree of information security by any method known in the art of data security.

The rules generator 160 is designed to correct a test generating rule 131 by at least:
  changing the input parameters which are used to generate the rule;
  generating a new rule on the basis of components picked out from old rules (assembly, compilation); and
  generating new rules on the basis of components specified in advance;

The correction of the test generating rule 131 is such that the probability of a successful passing of the test, generated on the basis of corrected rules 131, by the user of the computing device is greater than that of a test generated on the basis of uncorrected rules 131 (i.e., the test becomes easier for a specific authorized user).

For example, in text recognition problems 310, increasing greater distortion of the text 311-313 is used with each successful passing of the test, but not more than a specified value, so that the text does not become utterly unrecognizable to the user 314.

In one aspect, the correcting of the test generating rules 131 involves changing the degree of complexity of the tests generated by the test generator 130, the degree of complexity of the test being changed as a function of the degree of success in performing the test calculated by the analyzer 140.

In yet another aspect, the degree of complexity of the test is a numerical value characterizing the probability of the user of the computing device passing the test.

For example, the degree of complexity of the test may be measured from 0.0 (minimal complexity—the user can successfully pass the test with no additional preparation or additional effort) to 1.0 (maximum complexity—successful passing of the test requires considerable time or additional preparation by the user).

In yet another aspect, where the generated test is considered to be the standard test if it has a minimal degree of test complexity, the complication of the test (i.e., the difference from the standard test) involves at least:
introducing distortions (graphical in the case of a test for working with images, acoustic in the case of an audio test, and so forth)—3.11-3.14 (for a graphical test); and
increasing classes for a classification of objects or increasing the similarity of objects of different classes to each other—3.21-3.24.

In yet another aspect, the correcting of the rules is done so that afterwards, when new tests are created, the time to pass them is reduced for a given user of the computing device and it is increased for other users or for machines. With this goal, the time to pass the test is monitored for the particular user in order to correct the test (for example, make the test easier for the particular user) with the aim of increasing the speed of passing the test by the particular user; the actions of the user on the computing device are monitored and the tasks performed by the user are analyzed in order to select the type and themes of the tests (for example, if the user has been working with numbers for a long time, a numerical test is generated; if with images, a graphical test; if with texts, a textual test, and so forth).

For example, if the user readily recognizes images of birds, then images of rare birds or birds similar to known species are used more often in the tests generated for the user.

In yet another aspect, when each successive test is generated consideration is given to the external parameters of a previously generated test and its pass results, such that the pass results of the new test by the given user (the user who passed the previously created tests) are better than the pass results of the user for earlier tests; in a particular instance, such that the passing of the generated test is only possible given knowledge of the pass results of the previously created test by the user of the computing device.

For example, the solving of a previously generated test is the condition for classification of the following test, and the classification cannot be performed without knowing the condition for the classification.

In yet another aspect, the test is generated such that it can only be passed by a machine, and not by the user of the computing device, i.e., the test is generated on the basis of the pass results of previously generated tests so as to decrease (worsen) the pass results of new tests. Thus, the passing of such a test will mean, in contrast to the one described above, a compromising of the action 101 and a forbidding of its performance. For example, such a scheme might be used for computing devices which can be attacked (for example, with the aid of targeted cyberattacks) and which serve for an operational determination of the start of an attack (for example, honeypots a resource which is a lure to hackers), and the above-described protection scheme is necessary so that the attack through the "lure" is not able to present a threat to other computing devices connected to the "lure" (for example, a unified local computer network).

For example, a text recognition problem may contain such distorted text 314 that its recognition is possible only by machines, provided that algorithms are known for distorting a text image when generating the test.

The task template generator 170 is designed to:
gather data characterizing at least:
  1) the computing device on which the described task performance system is running;
  2) the software running on the computing device; and
  3) the tasks being performed by the working software running;
generate at least one task template on the basis of the data gathered; and
write the generated task template to the task template database 121.

Figure 2:
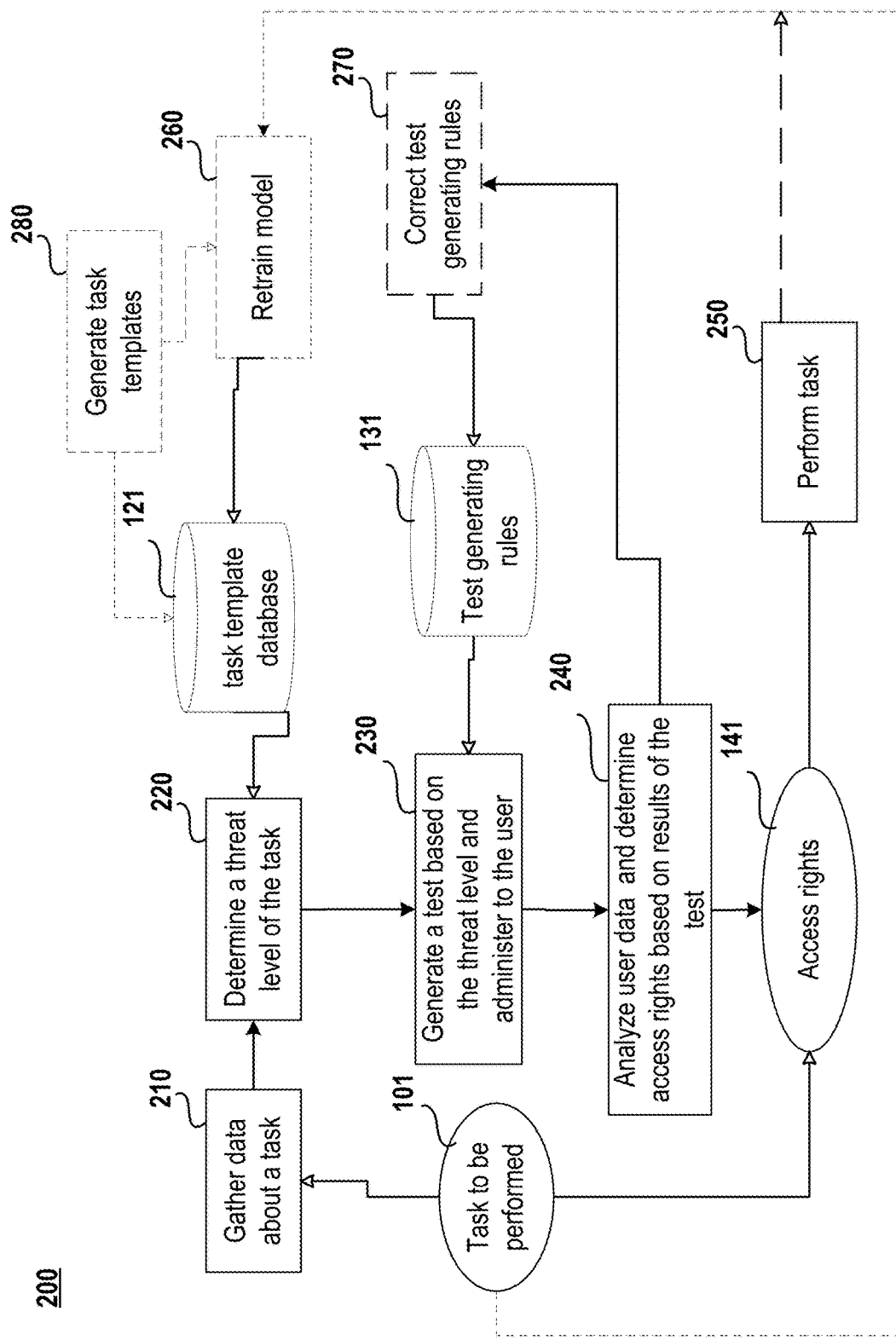
FIG. 2 illustrates a method for performing a task on a computing device based on access rights in accordance with aspect of the present disclosure.

FIG. 2 illustrates a method 200 for performing a task on a computing device based on access rights in accordance with aspect of the present disclosure.

The method for performing a task on a computing device includes a step 210 in which data is gathered for the task, a step 220 in which the threat level is determined for the task, a step 230 in which a test is generated, a step 240 in which user data is analyzed, a step 250 in which the action is performed, a step 260 in which the model is retrained, a step 270 in which the test generating rules are corrected, and a step 280 in which task templates are generated.

In step 210, method 200 gathers data about a task. For example, data characterizing a given control task of the computing device is gathered.

In step 220, method 200 determines a threat level of the task based on the gathered data and task templates. The threat level characterizes the level of threat (danger) to information security of the computing device if the task is performed on the computing device. In one aspect, the task templates are obtained from a database, e.g., task template database 121.

In step 230, method 200 generates a test based on the threat level and test generating rules and presents to the user. For example, an automated public Turing test (hereinafter, the test) is generated based on the threat level, as determined in step 220, and test generating rules 131. The generated test is then presented to the user. The user then takes the test and results of the test are collected.

In step 240, method 200 analyzes results of the test and determines access rights of the task based on the results.

In step 250, method 200 performs the task based on the access rights determined in step 240.

In optional step 260, the model used for determining the threat level is further retrained. In one aspect, the training/retraining depends on which task was allowed to be performed (after the user has passed the test), the rights with which the task was performed, and any consequences for information security of the computing device was subsequently produced by the allowed task being performed.

In optional step 270, the test generating rules 131 are further corrected so that the probability of successful passing of the test, generated on the basis of the corrected rules 131, by the user of the computing device is higher than that for a test generated on the basis of the uncorrected rules 131.

In addition, in optional step 280:
data is gathered characterizing at least:
1) the computing device on which the described task performance system is running;
2) the software running on the computing device; and
3) the tasks being performed by the software that is running;
at least one task template is generated on the basis of the gathered data; and
the generated task template is written to the task template database 121.

In one aspect, the task is for at least one of: control of a process for processing data including personal or confidential data of the user, control of a process being performed either on the computing device or on another computing device communicatively coupled to the computing device, control of an application, and changing or configuring working parameters of an operating system of the computing device.

In one aspect, the task is at least one of a task involving: a creation, a modification, or a deletion of personal or confidential data of the user on the computing device, a sending of data through a computer network, a creation or modification of files, a control of the computing device, and a control of software running on the computing device.

In one aspect, the task for the control of the computing device includes at least a task for: working with objects of a file system of the computing device, working with rights of objects of an operating system of the computing device, working with graphic interface elements of an application on the computing device, and controlling an operating mode of equipment of the computing device.

In one aspect, the data characterizing the task includes at least: parameters and attributes uniquely identifying the task from among a plurality of tasks, and parameters and attributes of the computing device that are necessary for performing the task.

In one aspect, the threat level is provided as a numerical value characterizing a probability of performing the task causing harm to information security of the computing device, the probability being based on the gathered data and a similarity of the task to another task for which a threat level has been previously determined.

In one aspect, the performing of the task comprises includes: performing the task on a virtual machine, determining whether the user successfully passes the test, and adopting changes made on the virtual machine to the computing device when the user successfully passes the test.

In one aspect, the threat level of a current task is determined as a function of threat levels of one or more previous tasks.

Figure 4:
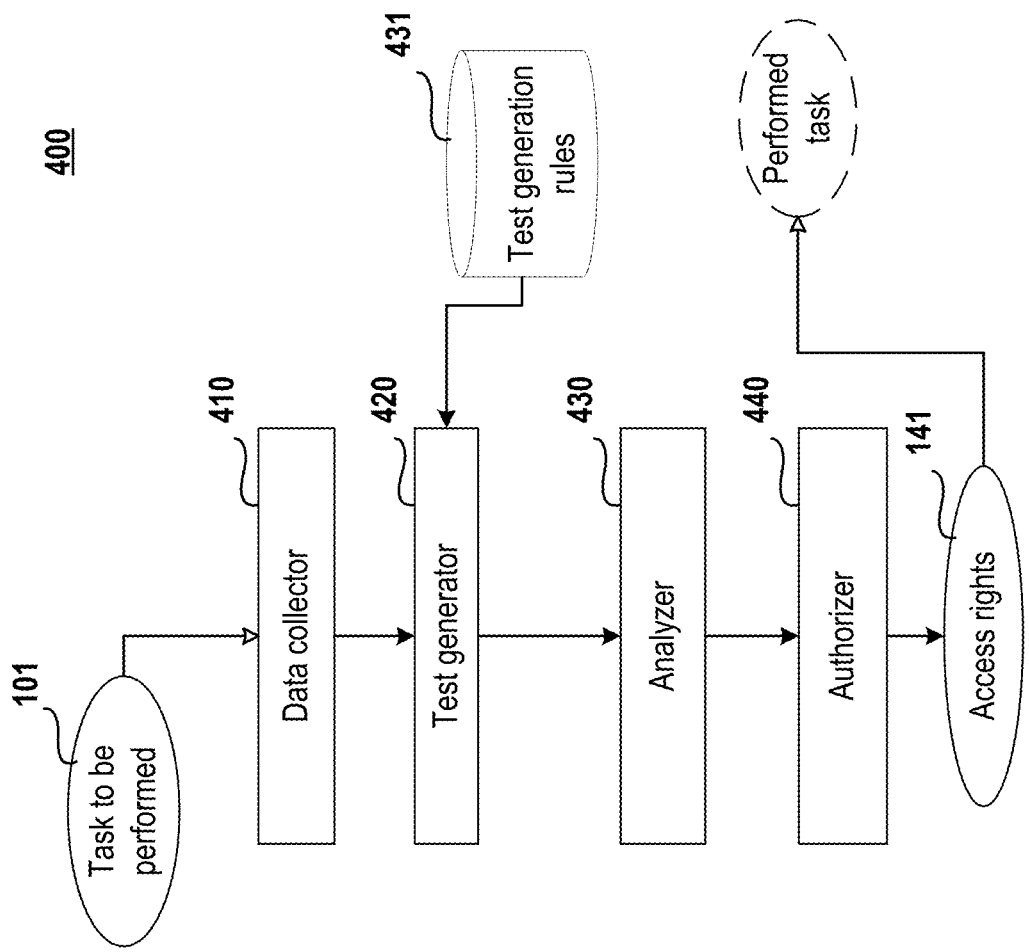
FIG. 4 illustrates an example of a system for authorizing a user on a computing device in accordance with aspect of the present disclosure.

FIG. 4 illustrates an example of a system 400 for authorizing a user on a computing device in accordance with aspects of the present disclosure.

The structural diagram of the system to authorize a user on a computing device contains a data collector 410, a test generator 420, an analyzer 430, and an authorizer 440.

The data collector 410 is designed to:
gather data characterizing at least two control tasks 101 of the computing device (hereinafter, the task) performed by a user not authorized on the computing device (i.e., an unauthorized user); and
send the data gathered to the test generator 420.

In one aspect, the gathering of data is done by the method described above by the system of FIG. 1 and the method of FIG. 2 for performing the task on a computing device. In other words, the data collector 410 may be the same as the data collector 110 of FIG. 1.

In another aspect, the authorization is provided in a gradual manner, wherein the gradual authorization comprises: affording, to an unauthorized user, partial rights to perform the tasks on the computing device, subsequently deciding whether the authorization to perform the tasks without limits should be granted, and authorizing the user to perform the tasks with full rights based on the subsequent decision.

For example, an unauthorized user, when afforded partial rights, may perform operations for reading data from the computing device, but at the same time be deprived of the right to write to the computing device.

In another aspect, the authorization of the user is provided as a numerical value in a predetermined range, the value designating rights and privileges of the user to perform tasks on the computing device. For example, instead of the authorization being a binary operation (authorized or unauthorized user), a certain numerical value of the access right may be used, the value characterizing which rights and privileges the user possesses to perform certain tasks on the computing device.

In one aspect, the numerical value is recalculated based on subsequent actions of the user. For example, the value may be recalculated, which may, in turn, allow the user to perform new tasks previously forbidden to him or her, or on the contrary restrict the rights to perform tasks that were previously allowed.

The test generator 420 is designed to: generate, for each task 101, a test based on the gathered data and the test generation rules, and present the test to the user. For example, an automated public Turing test (hereinafter, the test) may be generated on the basis of the data received from the data collector 410 and characterizing said task 101, using the test generating rules 131. The test generating rules are updated based on the results of tests presented to the user. For each subsequent task 101, the test generating rules 131 are corrected in accordance with the results of the performance of the user on the previously generated test, the previously generated test being based on the test generating rules 131 prior to the correction.

For example, if the user effectively performs graphical tests and is poor at linguistic (verbal) tests, more graphical tests are generated afterwards for that user.

In yet another example, the difficulty of the tests for a given user is maintained at the same level, and so, if the user begins to quickly pass the tests generated for him or her the difficulty of the tests begins to increase (or the types of tests change).

The analyzer 430 is designed to:
determine a degree of authenticity of the user on the basis of the results of tests presented to the user; in other words, the authenticity is determined based on the performance of the at least two tests generated by the test generator 420, where the degree of authenticity of the user indicates the probability that the user is a legitimate user on the computing device; and
calculate a summary degree of authenticity of the user based on degrees of authenticity determined for the user, and a duration of time specified by a test generation rule 431.

For example, the degree of authenticity of the user might be a numerical value from 0% to 100%, where 0% implies that the user is guaranteed to be not legitimate (not have the right to perform a given task on the computing device), while 100% implies that the user is legitimate, which automatically means that he/she is authorized on the computing device.

In yet another example, the user may be deemed legitimate if the degree of authenticity of the user exceeds a certain predetermined threshold value (for example, 85% in the above-described example).

In one aspect, the degree of authenticity of the user is determined based on user templates which represent a set of rules linking the test presented to the user, the result of the test performed by the user, and a numerical value characterizing a probability of the result being correct for the given test.

In yet another aspect, the change in values for consecutively calculated degrees of authenticity of the user is monotonic.

In yet another aspect, for each subsequent task the test generating rules 431 are corrected on the basis of the results of the test generated for the previous task and presented to the user such that the probability of passing the test increases for the user who has been granted authorization, but decreases for the user who has been denied authorization.

The authorizer 440 is designed to: make a decision whether or not to authorize the user to perform the task on the computing device. The decision is based on whether or not the summary degree of authenticity of the user exceeds a given threshold value.

In one aspect, system authorization may be taken to grant rights to a user to perform certain tasks. Thus, the user authorization might not be a binary system (authorized/not authorized), but instead a more complex discrete system.

For example, rights A (which the user obtains from the authorizer 440 after successfully passing M tests) are required to perform the task of reading from a file *.docx, while rights B (which the user obtains from the authorizer 440 after successfully passing N tests, where N>M) are required to perform the task of writing to a file *.docx.

In yet another aspect, the authorizer assigns a certain trust index to the user, being a numerical value and characterizing the tasks to which the user has access (for example, if the user trust index is above a certain value specified for that task).

For example, in order to work with system files an index above $P_{min}$>1000 is required, while in order to work with Microsoft Office documents an index above $P_{min}$>300 is required, wherein upon passing the test one time the user is assigned, in addition, a trust index of P+75.

Figure 5:
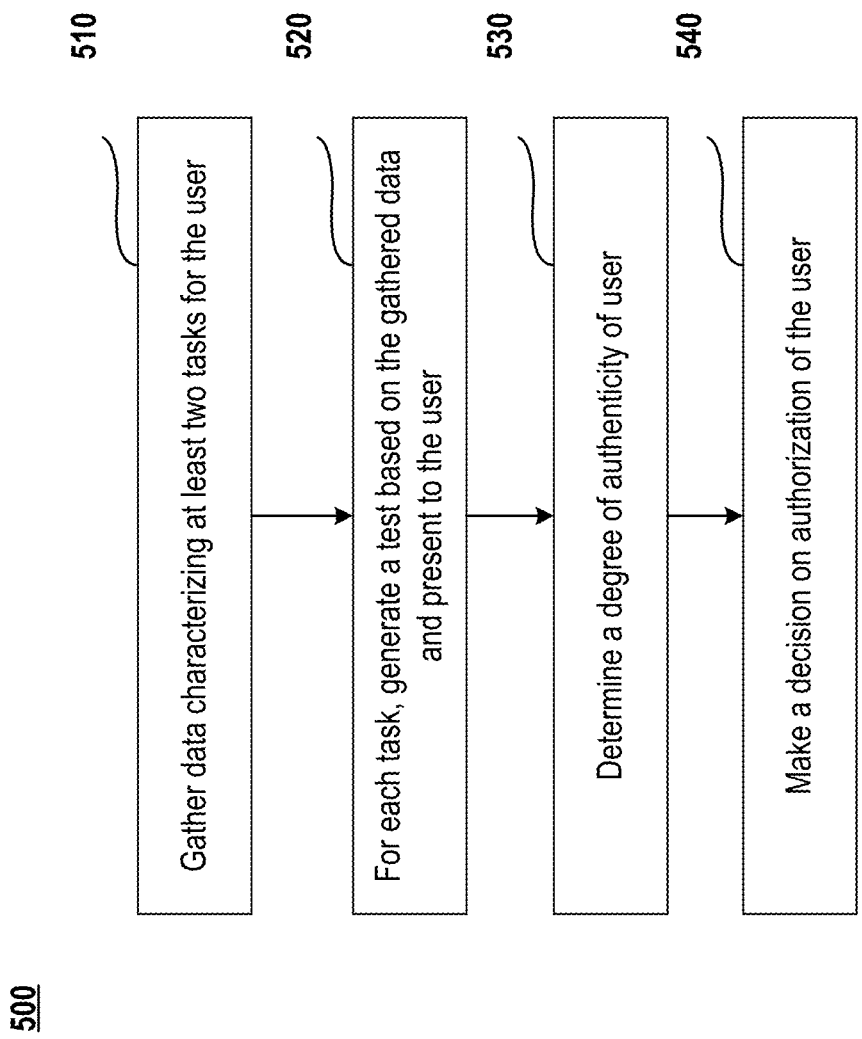
FIG. 5 illustrates a method for authorizing a user on a computing device in accordance with aspect of the present disclosure.

FIG. 5 illustrates a method 500 for authorizing a user on a computing device in accordance with aspects of the present disclosure.

The structural diagram of the method to authorize a user on a computing device contains a step 510 in which data is gathered, a step 520 in which a test is generated, a step 530 in which the degree of authenticity of the user is determined, and a step 540 in which the decision whether to authorize the user is made.

In step 510, the data collector 410 is used to gather data characterizing at least two tasks 101 of the computing device performed by a user not authorized on the computing device.

In step 520, the test generator 420 is used to generate, for each task 101, a test based on the gathered data and the test generating rules, and present the test to the user. For example, an automated public Turing test may be generated based on the data gathered in step 510 for task 101 and using the test generating rules 131. The test is then presented to the user. The results of the test are used to improve subsequent tests. In other words, for each subsequent task, the test generating rules are corrected in accordance with the results of test presented to the user, i.e., how well the user performed on the test.

In step 530, the analyzer 430 is used to determine the degree of authenticity of the user based on the results of the tests presented to the user, where the degree of authenticity of the user indicates a probability of the user being a legitimate user of the computing device. Thus, the analysis includes the results of at least two tests.

In step 540, the authorizer 440 is used to authorize the user to perform the task on the computing device. The user is authorized to perform the task when a summary degree of authenticity of the user exceeds a predetermined threshold value, the summary degree of authenticity of a user being calculated based on the degrees of authenticity of the user determined for each task. In one aspect, the authorization is further based on a duration of time specified by the test generating rules, the duration of time being for the user taking the test.

In one aspect, a level of authorization of the user is based on the summary degree of authenticity. In one aspect, the level of authorization including at least a partial authorization and an authorization with full rights (i.e., without limits to rights).

In one aspect, the authorization of the user is provided as a numerical value in a predetermined range, the value designating, for each task, rights and privileges of the user to perform the task on the computing device. In one aspect, the numerical value is recalculated based on actions of the user performed subsequent to the authorization.

Figure 6:
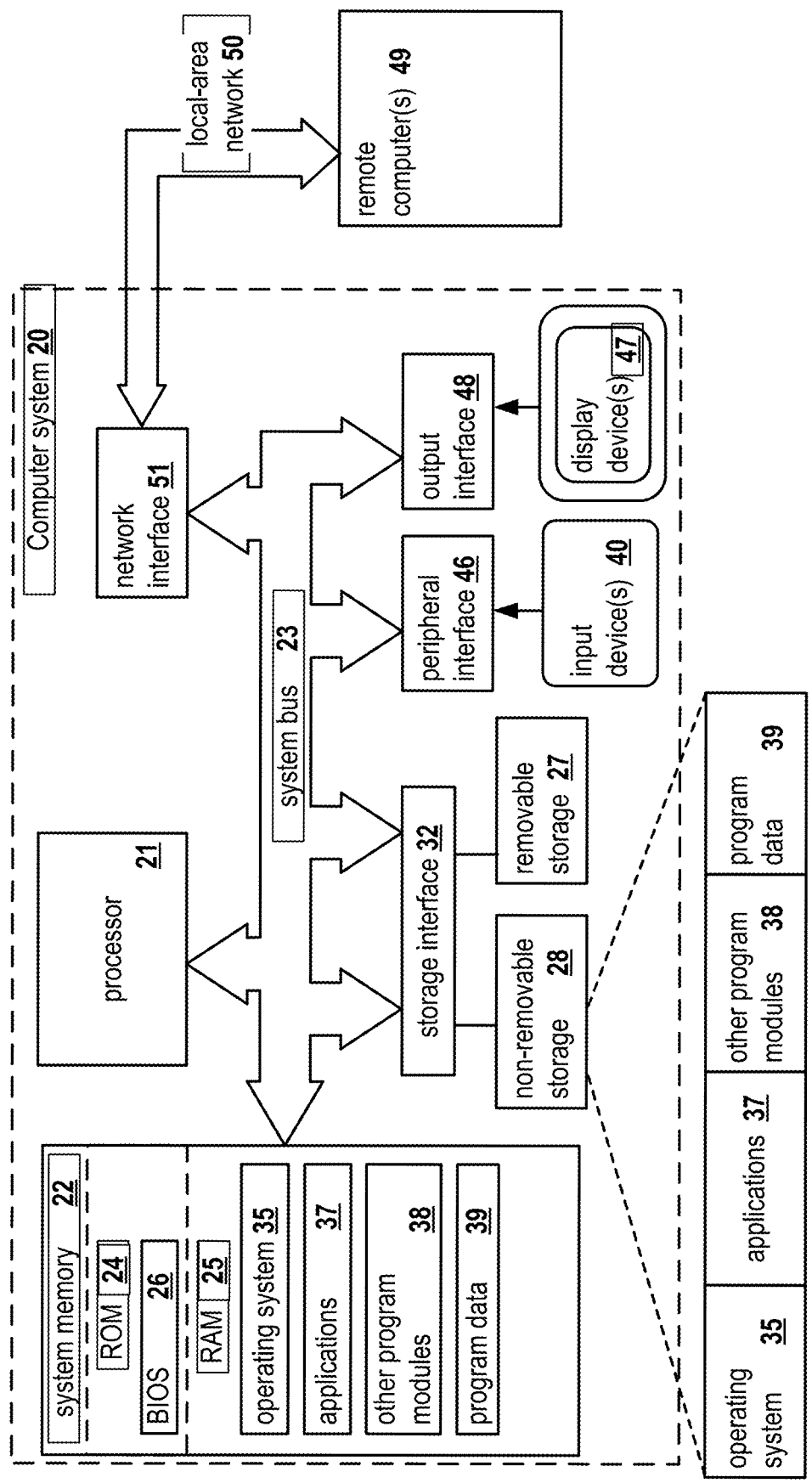
FIG. 6 presents an example of a general purpose computer system on which aspects of the present disclosure can be implemented.

In one aspect, for each subsequent task, the test generating rules are corrected based on results of the test taken by the user for a previous task, the correction being to increase a probability of passing the test by the user who has been granted authorization and to decrease the probability of passing the test by the user who has been denied authorization FIG. 6 is a block diagram illustrating a computer system 20 on which aspects of systems and methods for performing a task on a computing device based on access rights, may be implemented in accordance with exemplary aspects. It should be noted that the computer system 20 can correspond to a virtual security device 102, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing a task on a computing device based on access rights, the method comprising:

gathering data characterizing a task by intercepting function calls used to perform the task, and sending a request to an operating system of the computing device to temporarily interrupt the called functions until access rights are determined, wherein the function calls are used at least for blocking and unblocking of processes performing the tasks;

determining a threat level of the task based on the gathered data and task templates, wherein the threat level is provided as a numerical value characterizing a probability of performing the task causing harm to information security of the computing device, the probability being based on the gathered data and a similarity of the task to another task for which a threat level has been previously determined;

generating a test based on the threat level and test generating rules and presenting the test to the user;

analyzing results of the test and determining access rights of the task based on the results; and performing the task based on the access rights, wherein the performing of the task comprises:
  performing the task on a virtual machine;
  determining whether the user successfully passes the test; and
  adopting changes made on the virtual machine to the computing device when the user successfully passes the test.

2. The method of claim 1, wherein the task is for at least one of:
  control of a process for processing data including personal or confidential data of the user;
  control of a process being performed either on the computing device or on another computing device communicatively coupled to the computing device;
  control of an application; and
  changing or configuring working parameters of an operating system of the computing device.

3. The method of claim 1, wherein the task is at least one of a task involving:
  a creation, a modification, or a deletion of personal or confidential data of the user on the computing device;
  a sending of data through a computer network;
  a creation or modification of files;
  a control of the computing device; and
  a control of software running on the computing device.

4. The method of claim 3, wherein the task for the control of the computing device includes at least a task for:
  working with objects of a file system of the computing device;
  working with rights of objects of an operating system of the computing device;
  working with graphic interface elements of an application on the computing device; and
  controlling an operating mode of equipment of the computing device.

5. The method of claim 1, wherein the data characterizing the task includes at least:
  parameters and attributes uniquely identifying the task from among a plurality of tasks; and
  parameters and attributes of the computing device that are necessary for performing the task.

6. The method of claim 1, wherein the threat level of a current task is determined as a function of threat levels of one or more previous tasks.

7. A system for performing a task on a computing device based on access rights, comprising:
at least one processor configured to:
gather data characterizing a task by intercepting function calls used to perform the task, and send a request to an operating system of the computing device to temporarily interrupt the called functions until access rights are determined, wherein the function calls are used at least for blocking and unblocking of processes performing the tasks;
determine a threat level of the task based on the gathered data and task templates, wherein the threat level is provided as a numerical value characterizing a probability of performing the task causing harm to information security of the computing device, the probability being based on the gathered data and a similarity of the task to another task for which a threat level has been previously determined;
generate a test based on the threat level and test generating rules and presenting the test to the user;
analyze results of the test and determine access rights of the task based on the results; and
perform the task based on the access rights, wherein the performing of the task comprises:
performing the task on a virtual machine;
determining whether the user successfully passes the test; and
adopting changes made on the virtual machine to the computing device when the user successfully passes the test.

8. The system of claim 7, wherein the task is for at least one of:
control of a process for processing data including personal or confidential data of the user;
control of a process being performed either on the computing device or on another computing device communicatively coupled to the computing device;
control of an application; and
changing or configuring working parameters of an operating system of the computing device.

9. The system of claim 7, wherein the task is at least one of a task involving:
a creation, a modification, or a deletion of personal or confidential data of the user on the computing device;
a sending of data through a computer network;
a creation or modification of files;
a control of the computing device; and
a control of software running on the computing device.

10. The system of claim 9, wherein the task for the control of the computing device includes at least a task for:
working with objects of a file system of the computing device;
working with rights of objects of an operating system of the computing device;
working with graphic interface elements of an application on the computing device; and
controlling an operating mode of equipment of the computing device.

11. The system of claim 7, wherein the data characterizing the task includes at least:
parameters and attributes uniquely identifying the task from among a plurality of tasks; and
parameters and attributes of the computing device that are necessary for performing the task.

12. The system of claim 7, wherein the threat level of a current task is determined as a function of threat levels of one or more previous tasks.

13. A non-transitory computer readable medium storing thereon computer executable instructions for performing a task on a computing device based on access rights, including instructions for:
gathering data characterizing a task by intercepting function calls used to perform the task, and sending a request to an operating system of the computing device to temporarily interrupt the called functions until access rights are determined, wherein the function calls are used at least for blocking and unblocking of processes performing the tasks;
determining a threat level of the task based on the gathered data and task templates, wherein the threat level is provided as a numerical value characterizing a probability of performing the task causing harm to information security of the computing device, the probability being based on the gathered data and a similarity of the task to another task for which a threat level has been previously determined;
generating a test based on the threat level and test generating rules and presenting the test to the user;
analyzing results of the test and determining access rights of the task based on the results; and
performing the task based on the access rights, wherein the performing of the task comprises:
performing the task on a virtual machine;
determining whether the user successfully passes the test; and
adopting changes made on the virtual machine to the computing device when the user successfully passes the test.

14. The non-transitory computer readable medium of claim 13, wherein the task is for at least one of:
control of a process for processing data including personal or confidential data of the user;
control of a process being performed either on the computing device or on another computing device communicatively coupled to the computing device;
control of an application; and
changing or configuring working parameters of an operating system of the computing device.

15. The non-transitory computer readable medium of claim 13, wherein the task is at least one of a task involving:
a creation, a modification, or a deletion of personal or confidential data of the user on the computing device;
a sending of data through a computer network;
a creation or modification of files;
a control of the computing device; and
a control of software running on the computing device.

16. The non-transitory computer readable medium of claim 15, wherein the task for the control of the computing device includes at least a task for:
working with objects of a file system of the computing device;
working with rights of objects of an operating system of the computing device;
working with graphic interface elements of an application on the computing device; and
controlling an operating mode of equipment of the computing device.

17. The non-transitory computer readable medium of claim 13, wherein the data characterizing the task includes at least:
parameters and attributes uniquely identifying the task from among a plurality of tasks; and
parameters and attributes of the computing device that are necessary for performing the task.

18. The non-transitory computer readable medium of claim 13, wherein the threat level of a current task is determined as a function of threat levels of one or more previous tasks.

* * * * *